(12) United States Patent
Tester et al.

(10) Patent No.: US 7,894,987 B1
(45) Date of Patent: Feb. 22, 2011

(54) HOT ZONES TRIGGER METHOD FOR LOCATION-BASED APPLICATIONS AND SERVICES

(75) Inventors: David P. Tester, Swindon (GB);
Stephen P. Graham, Henley-on-Thames (GB)

(73) Assignee: u-blox AG, Thalwil (CH)

( * ) Notice: Subject to any disclaimer, the term of this patent is extended or adjusted under 35 U.S.C. 154(b) by 1098 days.

(21) Appl. No.: 11/613,280

(22) Filed: Dec. 20, 2006

(51) Int. Cl.
*H04Q 9/04* (2006.01)
(52) U.S. Cl. .................................. 701/213; 340/538.15
(58) Field of Classification Search ................. 701/213; 340/539.15, 539.13, 572.1, 538.11, 538.15
See application file for complete search history.

(56) References Cited

U.S. PATENT DOCUMENTS

| | | | |
|---|---|---|---|
| 5,661,460 A * | 8/1997 | Sallen et al. ............. | 340/573.4 |
| 6,639,516 B1 * | 10/2003 | Copley .................... | 340/573.4 |
| 7,133,685 B2 * | 11/2006 | Hose et al. ............... | 455/456.1 |
| 7,538,722 B2 * | 5/2009 | Thandu et al. ......... | 342/357.06 |
| 2003/0006931 A1 | 1/2003 | Mages | |
| 2006/0099969 A1 * | 5/2006 | Staton et al. ............. | 455/456.4 |
| 2007/0042790 A1 | 2/2007 | Mohi et al. .............. | 455/456.5 |

* cited by examiner

*Primary Examiner* — Dalena Tran

(57) ABSTRACT

A method for location-based zone triggering is disclosed. The method generally includes the step of (A) generating a position signal conveying a location of a device in at least two spatial dimensions in response to a plurality of navigation signals received from external the device and (B) generating a trigger signal at an interface based on the position signal, (i) a first aspect of the trigger signal indicating that the location is crossing a boundary of a zone, (ii) a second aspect of the trigger signal indicating that the device is one of entering the zone and leaving the zone and (iii) the interface adapting a zone module to communicate the trigger signal to an application module.

23 Claims, 11 Drawing Sheets

240

242 DOWNLOAD ALLOWABLE HOT ZONE

244 IN HOT ZONE? — YES

NO

246 CALL PARENT'S PHONE NUMBER

248 GENERATE SYNTHESIZED ALERT MESSAGE FOR PARENT

FIG. 9

HOT ZONES TRIGGER METHOD FOR LOCATION-BASED APPLICATIONS AND SERVICES

FIELD OF THE INVENTION

The present invention relates to a method and/or architecture for information distribution generally and, more particularly, to a hot zones trigger method for location-based applications and services.

BACKGROUND OF THE INVENTION

Conventional positioning systems, such as Global Position Satellite (GPS) receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users, for example enabling parents to track children, to deliver location-based information and advertising or to assist with navigation.

Due to power consumption constraints in battery operated equipment, conventional positioning systems are normally only enabled on demand from the user. Hence, the applications and services can only be delivered following an explicit request from the user to establish a current location. In contrast, the utility of the positioning features and the applications would be greatly enhanced if the receiver is capable of continuously tracking the location of the equipment. In such cases, applications that use the location information can proactively deliver location-based services to the user without waiting for any prior input from the user. To enable continuous use, however, the power consumption of both the positioning system that tracks the current user location and the applications that deliver services based on the current location should to be reduced to an absolute minimum.

SUMMARY OF THE INVENTION

The present invention generally concerns a method for location-based zone triggering. The method generally comprises the step of (A) generating a position signal conveying a location of a device in at least two spatial dimensions in response to a plurality of navigation signals received from external the device and (B) generating a trigger signal at an interface based on the position signal, (i) a first aspect of the trigger signal indicating that the location is crossing a boundary of a zone, (ii) a second aspect of the trigger signal indicating that the device is one of entering the zone and leaving the zone and (iii) the interface adapting a zone module to communicate the trigger signal to an application module.

The objects, features and advantages of the present invention include providing a hot zones trigger method for location-based applications and services that may (i) provide automatic position updates, (ii) consume minimal electrical power, (iii) trigger one or more applications upon entering one or more associated hot zones, (iv) power down one or more application upon leaving the associated hot zones and/or (v) provide hysteresis proximate hot zone boundaries.

BRIEF DESCRIPTION OF THE DRAWINGS

These and other objects, features and advantages of the present invention will be apparent from the following detailed description and the appended claims and drawings in which:

FIG. 9 is a flow diagram for an example child tracking operation;

DETAILED DESCRIPTION OF THE PREFERRED EMBODIMENTS

The present invention generally minimizes processing performed in user equipment (devices) that implement a wide range of location-based applications and services. Hence, the invention may minimize the power consumption of such implementations. The present invention may be implemented in a portable device carried by a user. The device generally comprises a positioning subsystem, a zone module and one or more application modules running a set of location-based applications and/or location-based services.

The applications and services may be associated with defined areas on the ground and/or volumes in space, termed hot zones. The invention periodically compares the hot zone definitions with a position (location) of the device. When the device crosses a boundary of a hot zone, one or more of the application modules may be interrupted to flag the boundary crossing event. The interrupted application modules may transition from a low/no power consumption mode to a high/full power consumption mode in response to the device entering the associated hot zone. Conversely, the interrupted application modules may transition from the high/full power consumption mode to the low/no power consumption mode in response to the device leaving the associated hot zones. As such, a total power consumption of a device may be reduced. Furthermore, the zone module may enhance navigation, child tracking, cellular telephone personalization and local advertising applications and/or services.

Figure 1:
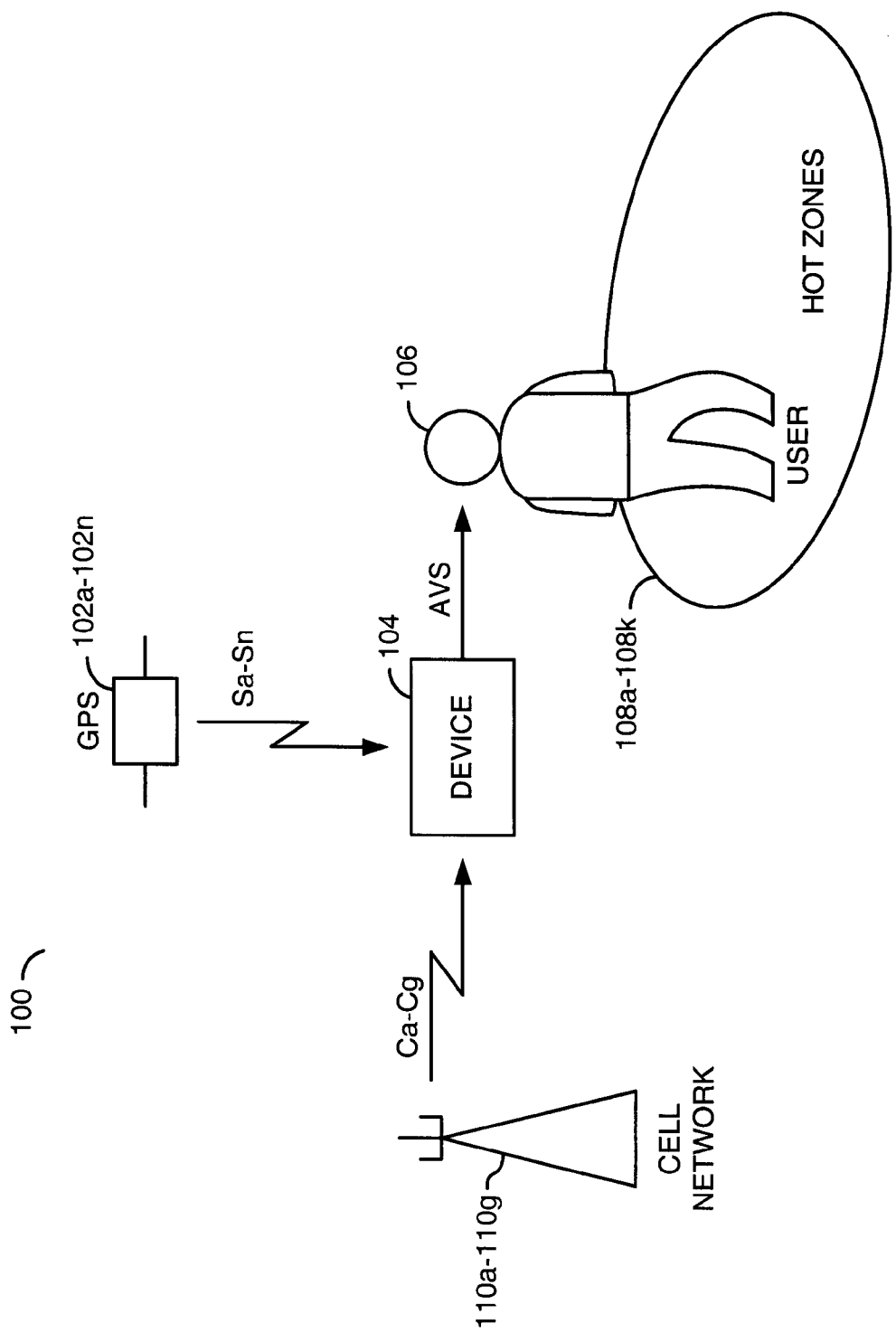
FIG. 1 is a diagram of a system in accordance with a preferred embodiment of the present invention.

Referring to FIG. 1, a diagram of a system 100 is shown in accordance with a preferred embodiment of the present invention. The system 100 generally comprises multiple navigation satellites 102a-102n, a device (or apparatus) 104, a user 106, one or more hot zones 108a-108k, and one or more optional cellular network towers 110a-110g. The device 104 may receive signals (e.g., Sa-Sn) from the navigation satellites 102a-102n. Multiple signals (e.g., Ca-Cg) may be transmitted from the cellular network towers 110a-110g to the device 104. A signal (e.g., AVS) may be generated and presented from the device 104 to the user 106 based on one or more zones 108a-108k where the device 104 is currently located. The signal AVS generally comprises one or more audio signals, one or more visual signals and/or one or more tactile signals (e.g., vibrations) perceivable by the user 106.

In some embodiments, the navigation satellites 102a-102n may be part of the Global Positioning System (GPS) system. In other embodiments, the satellites 102a-102n may be part of the GLObal NAvigation Satellite System (GLONASS). Other space-based positioning systems, such as the proposed Galileo project, may be used as the source of the signals Sa-Sn. Space-based and/or ground-based transmitters may also be used to increase the position measuring performance. For example, the Wide Area Augmentation System (WAAS), the European Geostationary Navigation Overlay Service (EGNOS), the Multi-Functional Satellite Augmentation System (MSAS) and/or the Differential Global Positioning System (DGPS) may be used to generated and/or augment the signals Sa-Sn and/or the signals Ca-Cg.

The device 104 may be implemented as a handheld (or portable) electronic device with an embedded navigation receiver. The device 104 may be operational to provide location-based applications and/or location-based services to the user 106 based upon the hot zones 108a-108k, information from the signals Sa-Sn and optionally information from the signals Ca-Cg. The device 104 may be implemented as a variety of items, such as a cell phone, a personal digital assistant, a laptop computer, a GPS receiver, a heads-up display and other battery powered equipment.

Each of the hot zones 108a-108k may be defined in two or more spatial dimensions and optionally in a time dimension. The hot zones may or may not overlap each other in time and/or space in various situations. Each of the hot zones 108a-108k generally defines one or more applications and/or one or more services available to the user 106.

The cellular network towers 110a-110g may be operational to provide cellular telephone services to the device 104. In some cases, the cellular network towers 110a-110g may also provide data services to the device 104. For example, each of the cellular network towers 110a-110g may transmit the definitions of the hot zones 108a-108k in and around a local cellular coverage area to the device 104. In other cases, the cellular network towers 110a-110g may act as references from which the device 104 may triangulate a current location.

Figure 2:
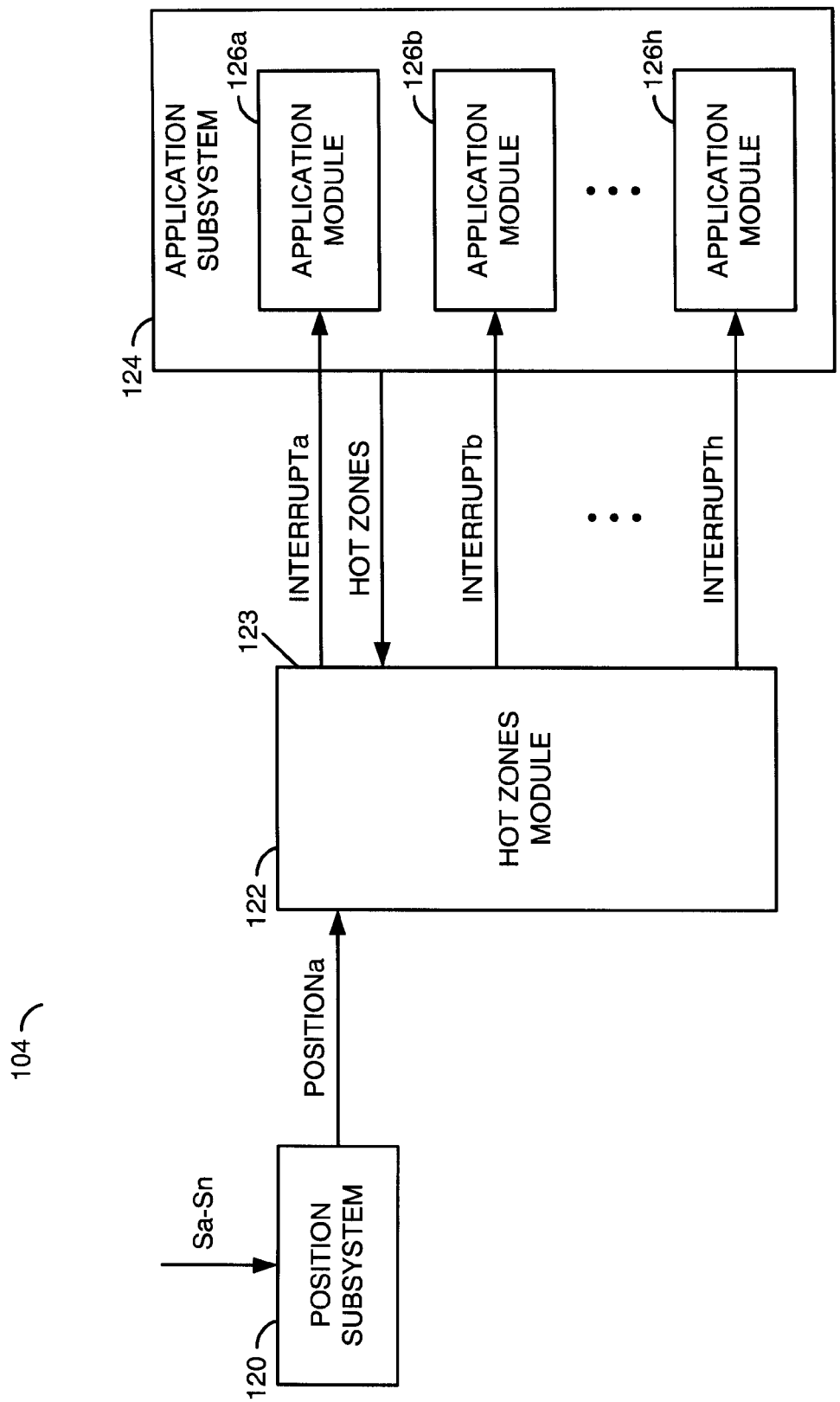
FIG. 2 is a block diagram of an example implementation of a device in the system.

Referring to FIG. 2, a block diagram of an example implementation of the device 104 is shown. The device 104 generally comprises a module (or subsystem) 120, a module (or circuit) 122 and a module (or subsystem) 124. The signals Sa-Sn may be received by the subsystem 120. A signal (e.g., POSITIONa) may be generated and presented from the subsystem 120 to the module 122. The module 122 may generate and present one or more signals (e.g., INTERRUPTa-INTERRUPTh) through an interface 123 to the subsystem 124. The subsystem 124 may generate and present a signal (e.g., HOT ZONES) back to the module 122 through the interface 123.

The subsystem 120 may be implemented as a position subsystem. The subsystem 120 may be operational to continuously calculate a current location of the device 104 based on the signals Sa-Sn and/or the signals Ca-Cg. A velocity of the device 104, a trajectory (or direction) of the device 104 and a current time may also be calculated by the subsystem 120. Other navigation type signals may be used as input to the calculations.

The module 122 may be implemented as a hot zone module. The module 122 may be operational to generate the signals INTERRUPTa-INTERRUPTh based on the hot zone definitions received in the signal HOT ZONES and the signal POSITIONa. The module 122 may be created in hardware and/or software executing on a processor within the device 104. The processor may be (i) dedicated to the module 122 or (ii) shared between the module 122 and the subsystem 120 and/or the subsystem 124. In addition to the logical arrangement shown in FIG. 2, the module 122 may be implemented as a part of the subsystem 120, as part of the subsystem 124, or as a separate subsystem standing alone. A partitioning decision may be made according to whichever arrangement yields the lowest overall system power consumption.

The subsystem 124 may be implemented as an application subsystem. The subsystem 124 generally comprises one or more application modules (or circuits) 126a-126h. The modules 126a-126h may be implemented in one or more processors, dedicated hardware modules, software modules, combinations of hardware and software and/or other computing systems. The subsystem 124 may exist (i) within the device 104 (for example, running on one or more processors in a cellular handset type of device 104), (ii) separately from the device 104 (for example, within a cellular telephone network) or (iii) the subsystem 124 may span the device 104 and other external equipment.

Figure 3:
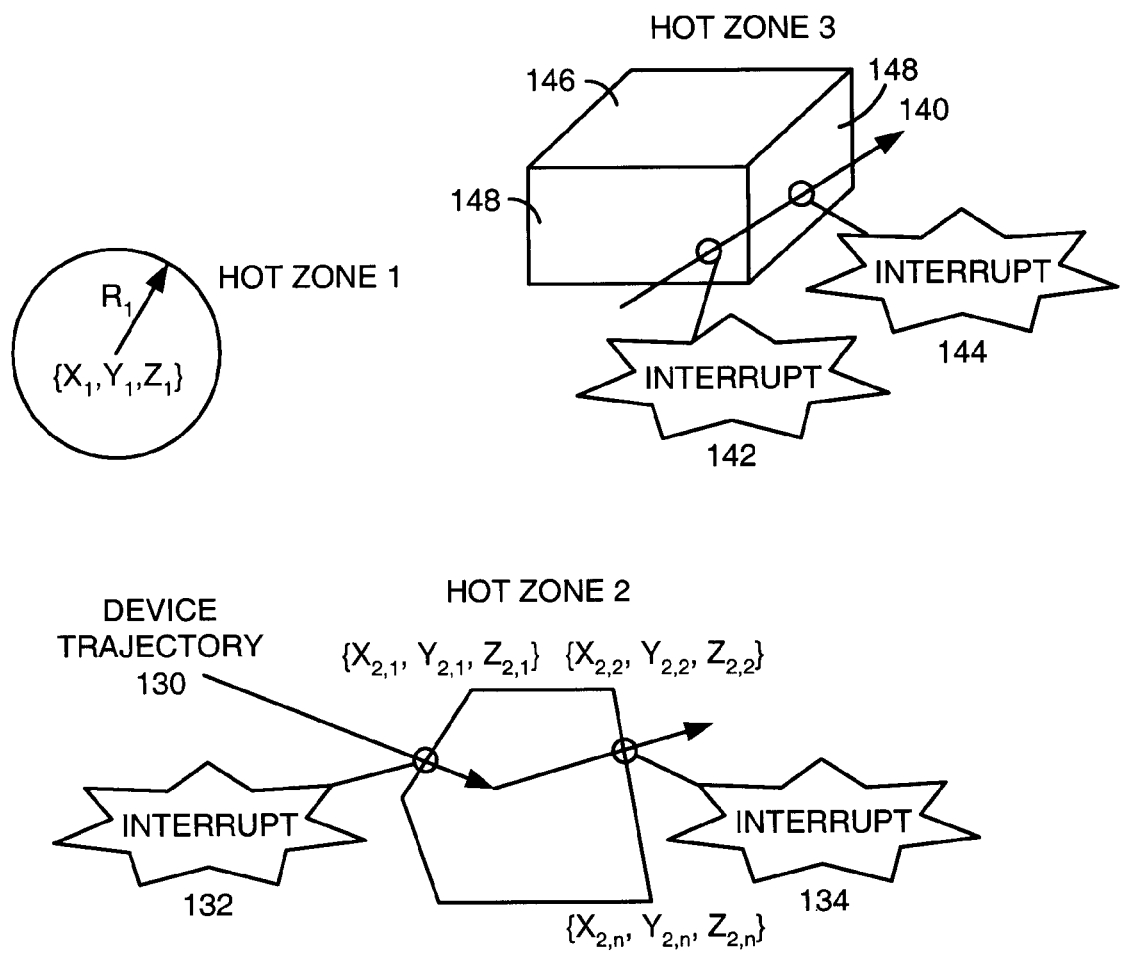
FIG. 3 is a diagram illustrating several example hot zones.

Referring to FIG. 3, a diagram illustrating several example hot zones 108a-108k is shown. The hot zones 108a-108k may be either areas on the surface of the Earth (e.g., defined in two spatial dimensions) or volumes defined in space (e.g., defined in three spatial dimensions). Some, none or all of the hot zones 108a-108k may change as a function of time. The subsystem 124 generally defines the hot zones 108a-108k according to the specifications of one or more applications and/or one or more services running therein. The subsystem 124 may update the hot zone definitions at anytime to create new hot zones, modify existing hot zones and/or delete hot zones. Generally, the hot zones 108a-108k may be separated in space and/or time, overlapping or completely enclosed by other hot zones 108a-108k.

Three techniques for defining hot zones 108a-108k are illustrated in FIG. 3. A first hot zone (e.g., hot zone 1) may be defined by the coordinates of a point (e.g., {X1,Y1, Z1}) and a radius (e.g., R1) around the point. If the point {X1,Y1, Z1} is specified in two spatial dimensions, the hot zone 1 may represent a circle with radius R1 on the surface of the Earth. Alternatively, the point (X1,Y1, Z1) may be specified in three spatial dimensions. Therefore, the hot zone 1 may represent a sphere, also with radius R1, that may be at any altitude above the surface of the Earth (for example, on the upper floors of a building).

A second hot zone (e.g., hot zone 2) is generally defined as a set of coordinates representing (i) the vertices of a polygon in two dimensions or (ii) the vertices of a polyhedron in three dimensions. The hot zone 2 may have three or more two-dimensional boundary line-segments or four or more three-dimensional boundary surfaces. A device 104 following a trajectory 130 may generate a first interrupt 132 when entering the hot zone 2 and a second interrupt 134 when leaving the hot zone 2.

A third hot zone (e.g., hot zone 3) may be defined as a volume in space. The boundaries of the hot zone 3 may be the surfaces of the volume. A device 104 following a trajectory 140 may generate a first interrupt 142 when entering the hot zone 3 and a second interrupt 144 when leaving the hot zone 3.

The hot zones (e.g., hot zone 3) may include definitions of one or more sections along the perimeter and/or one or more regions on the surface of the hot zone where a boundary crossing is either valid or invalid. For example, a top side 146 of the hot zone 3 may be marked as an invalid crossing region and the remaining sides 148 of the hot zone 3 may be marked as valid crossing regions.

Figure 4:
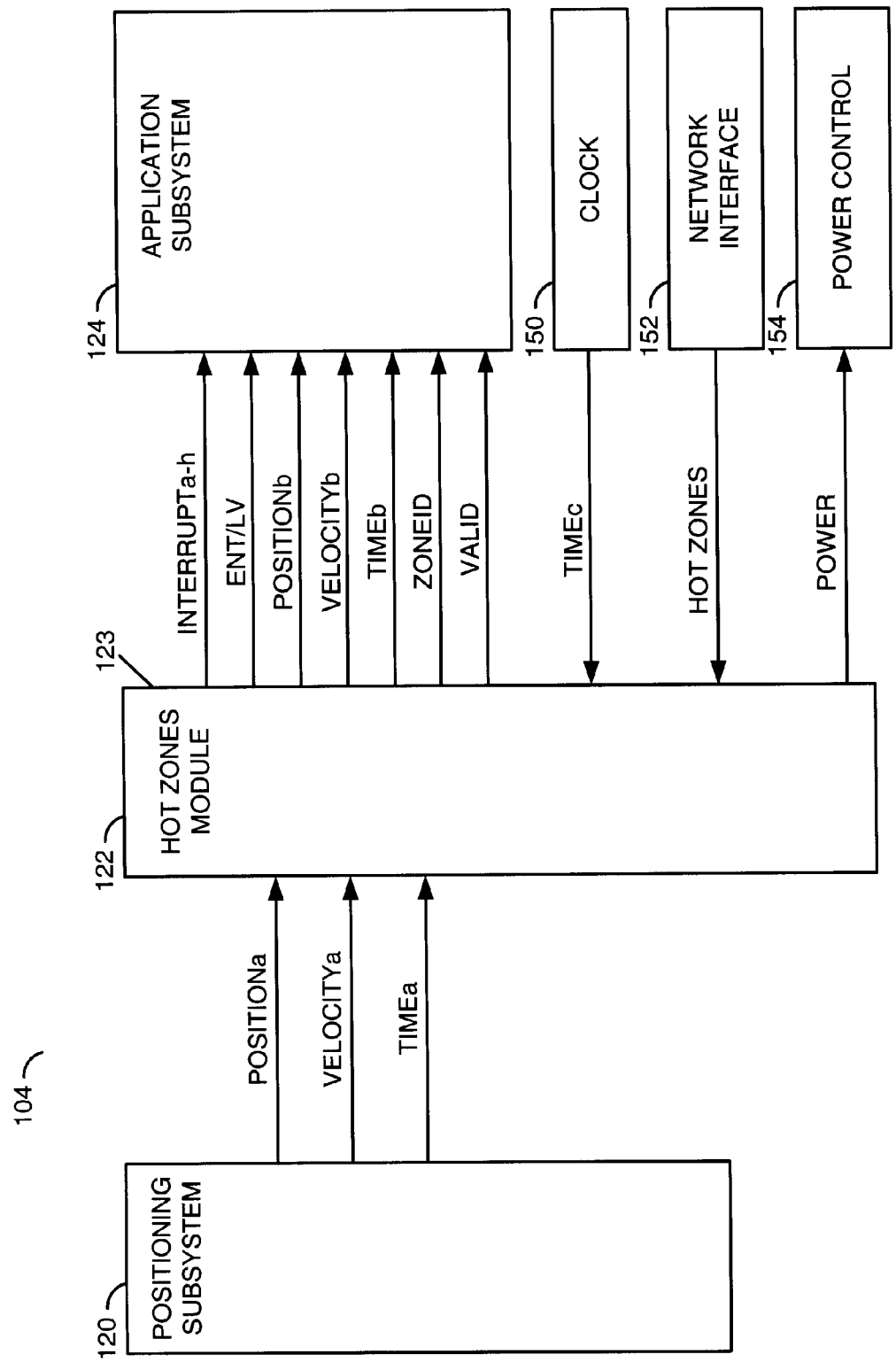
FIG. 4 is a detailed block diagram of the example implementation of the device.

Referring to FIG. 4, a detailed block diagram of an example implementation of the device 104 is shown. The device 104 generally comprises the subsystem 120, the module 122, the subsystem 124, a module (or circuit) 150, a module (or circuit) 152 and a module (or circuit) 154.

The subsystem 120 may generate and present a signal (e.g., VELOCITYa) to the module 122. The signal VELOCITYa generally indicates a current velocity (and direction) of the device 104. A signal (e.g., TIMEa) may also be calculated and presented from the subsystem 120 to the module 122. The signal TIMEa generally conveys a current time as calculated from the signals Sa-Sn and/or Ca-Cg.

A signal (e.g., ENT/LV) may be generated by the module 122 and presented through the interface 123 to the subsystem 124. The signal ENT/LV may indicate if the device 104 is entering or leaving a hot zone 108a-108k. A combination of one of the signals INTERRUPTa-INTERRUPTh and the signal ENT/LV may be used to convey multiple aspects of a boundary crossing. The combination may be referred to as a trigger signal. For example, a first aspect may be that the boundary was crossed. A second aspect may be the direction of the crossing, either entering or leaving. As such, the trigger signal may have many different implementations. For example, the signals INTERRUPTa-INTERRUPTh may convey the first aspect that an associated boundary has been crossed while the signal ENT/LV conveys the second aspect of crossing direction. In another example, each of the signals INTERRUPTa-INTERRUPTh may be a pair of signals, one for the entering aspect and the other for the leaving aspect. Other combinations of the signals INTERRUPTa-INTERRUPTh and/or the signal ENT/LV may be implemented to meet the criteria of a particular application.

A signal (e.g., POSITIONb) may be presented from the module 122 to the subsystem 124. The signal POSITIONb may be the location of the device 104 at the boundary crossing event. A signal (e.g., VELOCITYb) may be presented from the module 122 to the subsystem 124. The signal VELOCITYb may be the velocity (and direction) of the device 104 at the boundary crossing event. A signal (e.g., TIMEb) may be presented from the module 122 to the subsystem 124. The signal TIMEb may convey a time of the boundary crossing event. A signal (e.g., ZONEID) may also be generated and presented from the module 122 to the subsystem 124. The signal ZONEID may identify one or more hot zones 108a-108k involved in the boundary crossing event. The module 122 may generate and present a signal (e.g., VALID) to the subsystem 124. The signal VALID generally indicates if the boundary crossing is through a valid segment/region or an invalid segment/region.

A signal (e.g., TIMEc) may be generated by the module 150 and presented to the module 122. The signal HOT ZONES may be generated and presented from the module 152 to the module 122. A signal (e.g., POWER) may be generated by the module 122 and presented to the module 154. The signal POWER may carry information to reduce power/sleep/stop execution of the various modules 126a-126h and/or the module 122. The signal POWER may also carry information to increase/wake/start execution of the various modules 126a-126h and/or the module 122.

The module 122 may continuously compare the device position in either two, three or four dimensions to the predefined hot zones 108a-108k. When the user 106 carries the device 104 across a boundary of a hot zone 108a-108k (either entering or leaving), the module 122 generates an interrupt to notify one or more modules 126a-126h corresponding to the relevant hot zones 108a-108k of the crossing event. Following the interrupt, the module 122 generally communicates which hot zone boundary has been crossed, whether the device 104 was entering or leaving the hot zone 108a-108k and optionally if the crossing was valid or invalid. If appropriate for the modules 126a-126h, the module 122 may also pass through from the subsystem 120 the location of the device 104 in the signal POSITIONb and the velocity of the device 104 in the signal VELOCITYb at the time of crossing the boundary.

Once the hot zones 108a-108k have been defined, the modules 126a-126h may shut down/enter a low power consumption mode awaiting an interrupt from the module 122. After a signal INTERRUPTa-INTERRUPTh is asserted, the associated modules 126a-126h may be powered up/enter a full power consumption mode. By having a single module 122 serving multiple modules 126a-126h, the power consumption of the total device 104 may be reduced compared with having a dedicated module 122 for each of the modules 126a-126h.

The module 150 may be implemented as a clock module. The module 150 may be operational to keep a local time of the device 104, as conveyed in the signal TIMEc. In some embodiment, the module 150 may be updated to synchronize with the current time in the signal TIMEa.

The module 152 may be implemented as a network interface. The module 152 may be operational to transfer the hot zone definitions to the module 122. The module 152 may receive the hot zone definitions through the signals Ca-Cg and/or a communication channel to a personal computer or other source of the definitions.

The module 154 may be implemented as a power control module. The module 154 is generally operational to control power to the hardware and/or execution of software for the modules 126a-126h and the module 122. Power control may include, but is not limited to, application/removal of electrical power, timing of software execution and/or increasing/decreasing clock speeds.

Figure 5:
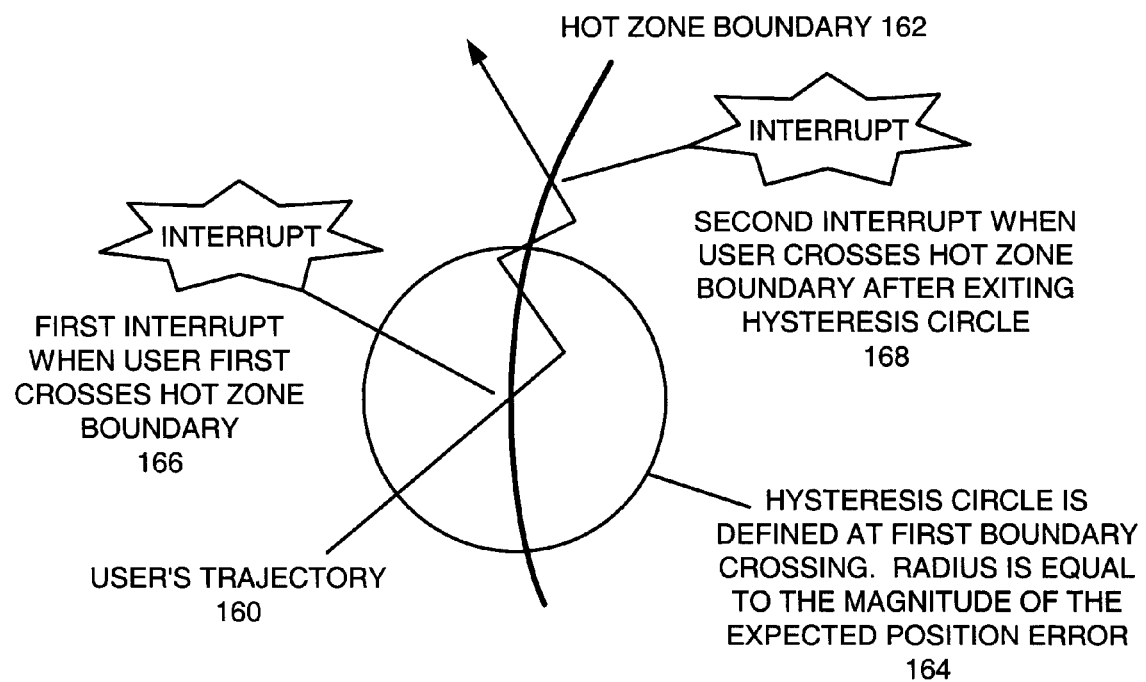
FIG. 5 is a diagram of an example trajectory near a hot zone boundary.

Referring top FIG. 5, a diagram of an example trajectory 160 near a boundary 162 of a hot zone is shown. Generally, the device position as reported by the subsystem 120 may be subject to some finite error. The magnitude of the error generally depends on the technology used in the subsystem 120 and thus determines a radius of a hysteresis circle 164 or sphere around the device 104 and the user 106. After the module 122 has reported a first crossing of a particular boundary (e.g., the interrupt 166), the module 122 may not report another crossing of the particular boundary until the device position has exceeded the hysteresis circle/sphere 164 defined at the first boundary crossing 166. After the device 104 has cleared the hysteresis circuit/sphere 164, a subsequent crossing of the particular boundary may trigger another interrupt 168. The hysteresis generally prevents an associated module 126a-126h from rapidly alternating between an active state and an inactive state as the trajectory 160 wanders back and forth across the boundary 162.

Figure 6:
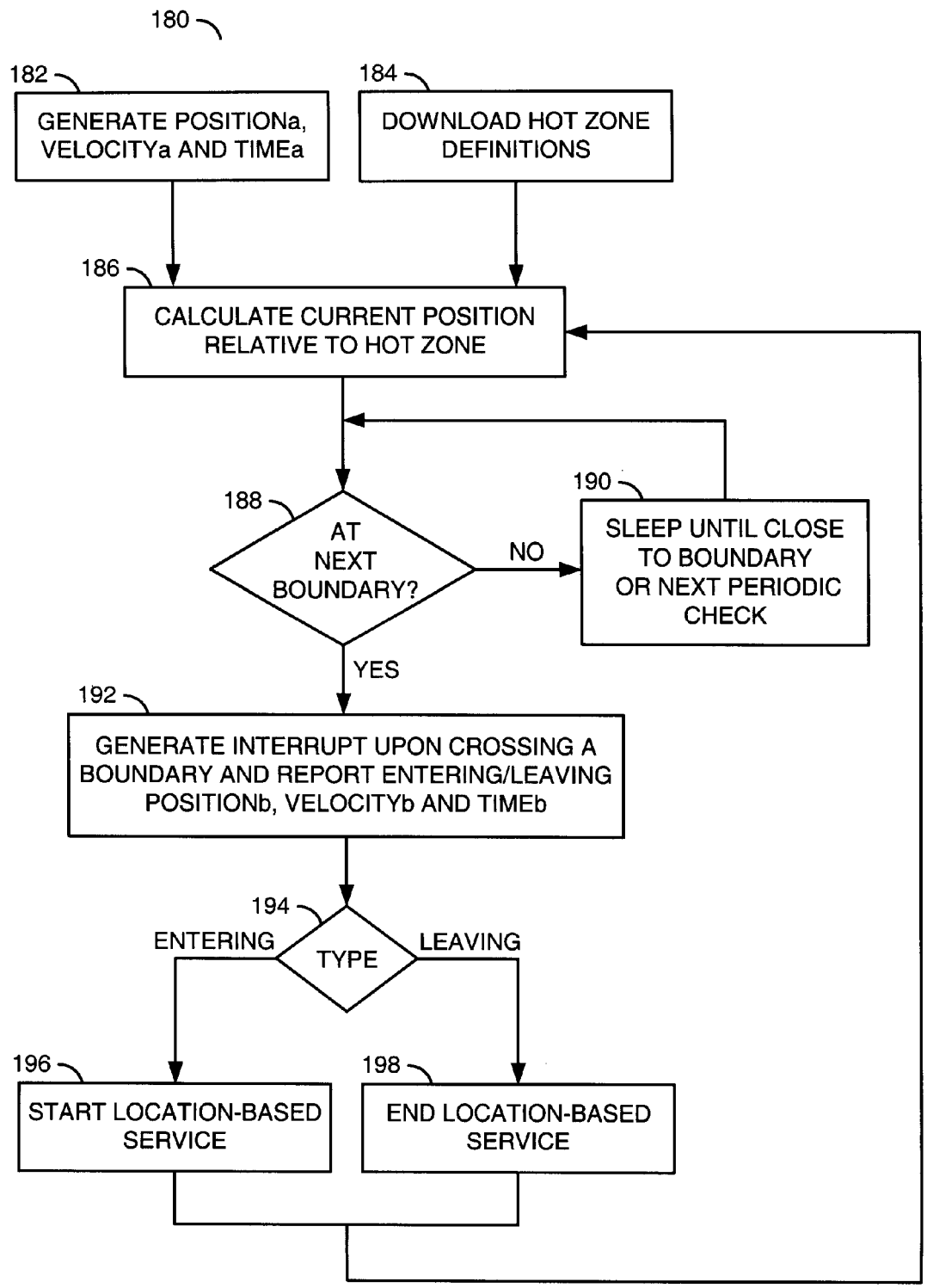
FIG. 6 is a flow diagram of an example operation of the device.

Referring to FIG. 6, a flow diagram of an example operation 180 of the device 104 is shown. The operation (or method) 180 generally comprises a step (or block) 182, a step (or block) 184, a step (or block) 186, a step (or block) 188, a step (or block) 190, a step (or block) 192, a step (or block) 194, a step (or block) 196 and a step (or block) 198.

In the step 182, the subsystem 120 may generate the current position of the device 104 in the signal POSITIONa, the current velocity of the device 104 in the signal VELOCITYa and the GPS time in the signal TIMEa. In the step 184, hot zone definitions may be downloaded into the device 104.

By using basic knowledge of a maximum speed that the user 106 is likely to reach, combined with the current position as reported by the subsystem 120, the module 122 may predict for each hot zone 108a-108k an earliest time that the user 106 may cross the corresponding boundaries in the step 186.

Therefore, the power consumption of the module 122 may be further optimized by checking for a boundary crossing no earlier than the predicted earliest time. After the check is made (e.g., the NO branch of step 188), the module 122 may enter a sleep mode in the step 190 until the user 106 is likely to be close to a boundary and/or a time is reached for a next periodic check. Back in the step 186, the predicted earliest time may be updated based on the new position. If the subsystem 120 also reports the device velocity to the module 122, the calculation of the earliest possible time for a boundary crossing may be refined, further reducing the power consumption of the module 122.

When a boundary has been crossed (e.g., the YES branch of step 188), the module 122 may generate an appropriate signal INTERRUPTa-INTERRUPTh in the step 192, report entering or leaving the hot zone in the signal ENT/LV, the position of crossing in the signal POSITIONb, the velocity (including trajectory) of crossing in the signal VELOCITYb, the time of crossing in the signal TIMEb and the validity of the crossing in the signal VALID. If the boundary crossing is an entry into the hot zone 108a-108k (e.g., the ENTERING branch of step 194), the corresponding one or more modules 126a-126h may be started/powered up in the step 196. If the boundary crossing is a departure from the hot zone (e.g., the LEAVING branch of step 194), the corresponding one or more modules 126a-126h may be stopped/powered down in the step 198.

If the subsystem 120 is based on satellite positioning technology, such as the GPS system, time may be continuously reported to the module 122 in the signal TIMEa. Alternatively, time may be reported to the module 122 from another source, such as the clock 150. With a time capability, at least two enhancements may be included in the present invention to simplify the subsystem 124 further, thus reducing the total power consumption.

In a first enhancement, hot zones 108a-108k may be defined to be valid only at certain times. The module 122 generally compares the device position and the time with each predefined hot zone 108a-108k. Because of the comparison, the interrupts to the subsystem 124 may be asserted when a boundary is crossed at a time when the boundary is valid.

In a second enhancement, the size, shape and position of a hot zone may be defined to change with time. For example, dynamic boundaries may be interpolated by the module 122 between vertices defined at different points in time. Such dynamic boundaries may be used to define hot zones relative to moving objects, such as automobiles, trains and/or airplanes.

Figure 7:
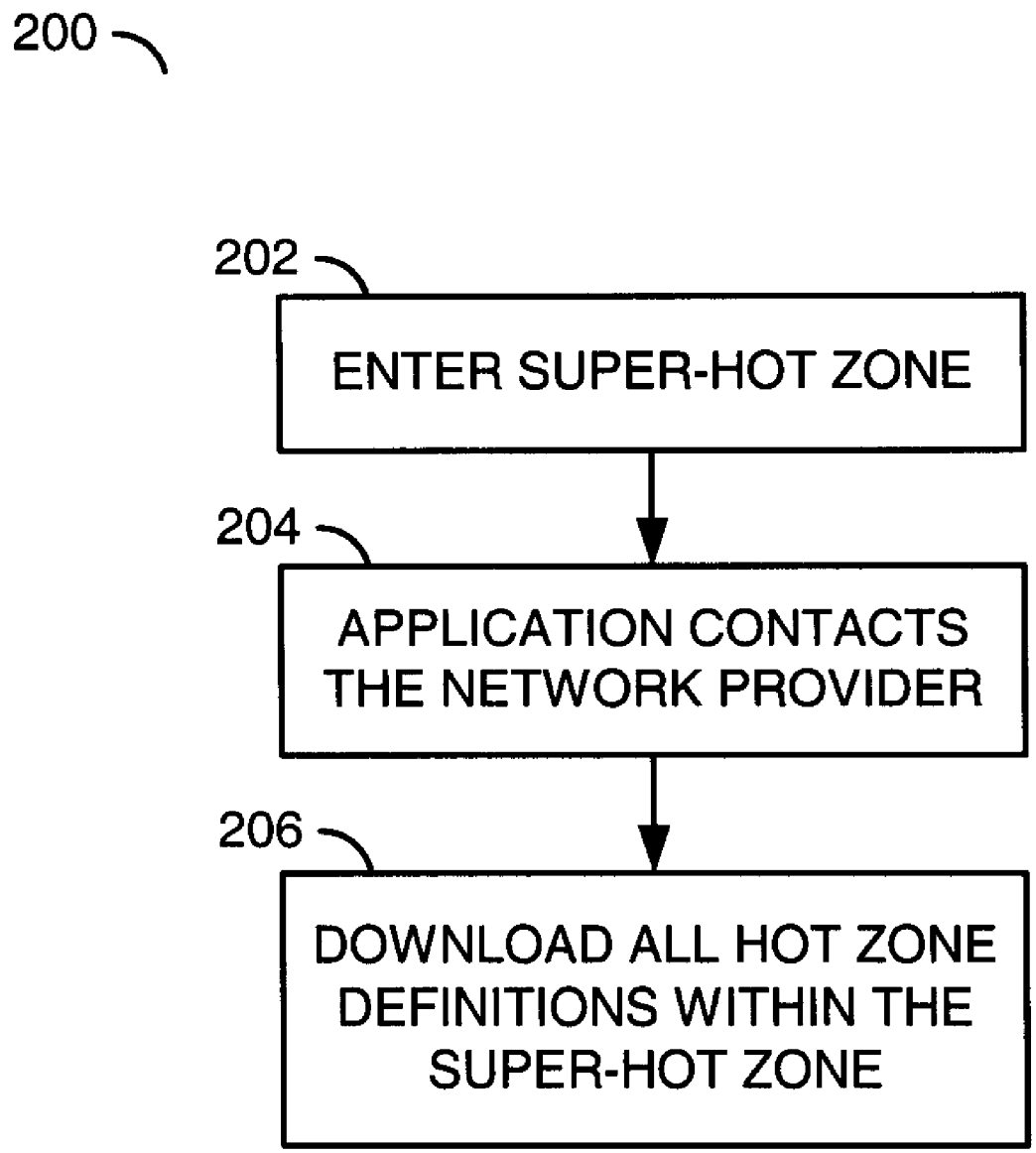
FIG. 7 is a flow diagram of an example method for handling a group of hot zones.

Referring to FIG. 7, a flow diagram of an example method 200 for handling a group of hot zones is shown. The method (or process) 200 may be implemented as a super hot zone technique. The method 200 generally comprises a step (or block) 202, a step (or block) 204 and a step (or block) 206.

Interest exists in delivering location-based services and applications to cell phones via cellular networks. A typical implementation of such services and applications would be for the cellular network to continuously track the location of a cell phone. Whenever the cell phone arrives at some predefined locations, data is downloaded from the cellular network to the cell phone to deliver the service.

With the present invention, the hot zones 108a-108k and all associated application data may be downloaded from the cellular network to the cell phone only periodically. For example, a set of hot zones (e.g., 108a-108c) may be enclosed by a larger super hot zone (e.g., 108d). When the device 104 crosses a super hot zone boundary (e.g., the step 202), the network interface 152 may contact the network provider of the super hot zone in the step 204. All of the definitions for the grouped hot zones 108a-108c and application data pertinent to the area defined by the super hot zone 108d may be downloaded from a network to the device 104 in the step 206. Thereafter, while the device 104 (e.g., a cell phone) remains in the new super hot zone 108d, the individual hot zones 108a-108c may be monitored automatically by the module 122 and application data may be delivered to the user 106 without any further interaction with the network.

The super hot zone scenario generally delivers several important benefits. A first benefit may be that use of network resources is generally optimized. For example, the precise timing for downloading the hot zones and application data to the cell phone may be adjusted to suit network conditions. Furthermore, the module 122 generally manages delivery of the application data to the user 106 via the signal AVS. Hence, no timing-critical interactions may be created with the network.

Another benefit may in terms of privacy. The network provider of the super hot zone may not precisely track the location of the user 106 to download hot zone definitions and associated application data. Instead, the network provider only knows when the user 106 crosses into a super hot zone boundary (e.g., when the device 104 registers with the cell associated with the super hot zone). As such, information regarding the precise location of the user 106 generally resides only in the cell phone device 104, not with the network provider, avoiding any concerns that may arise regarding privacy.

Figure 8:
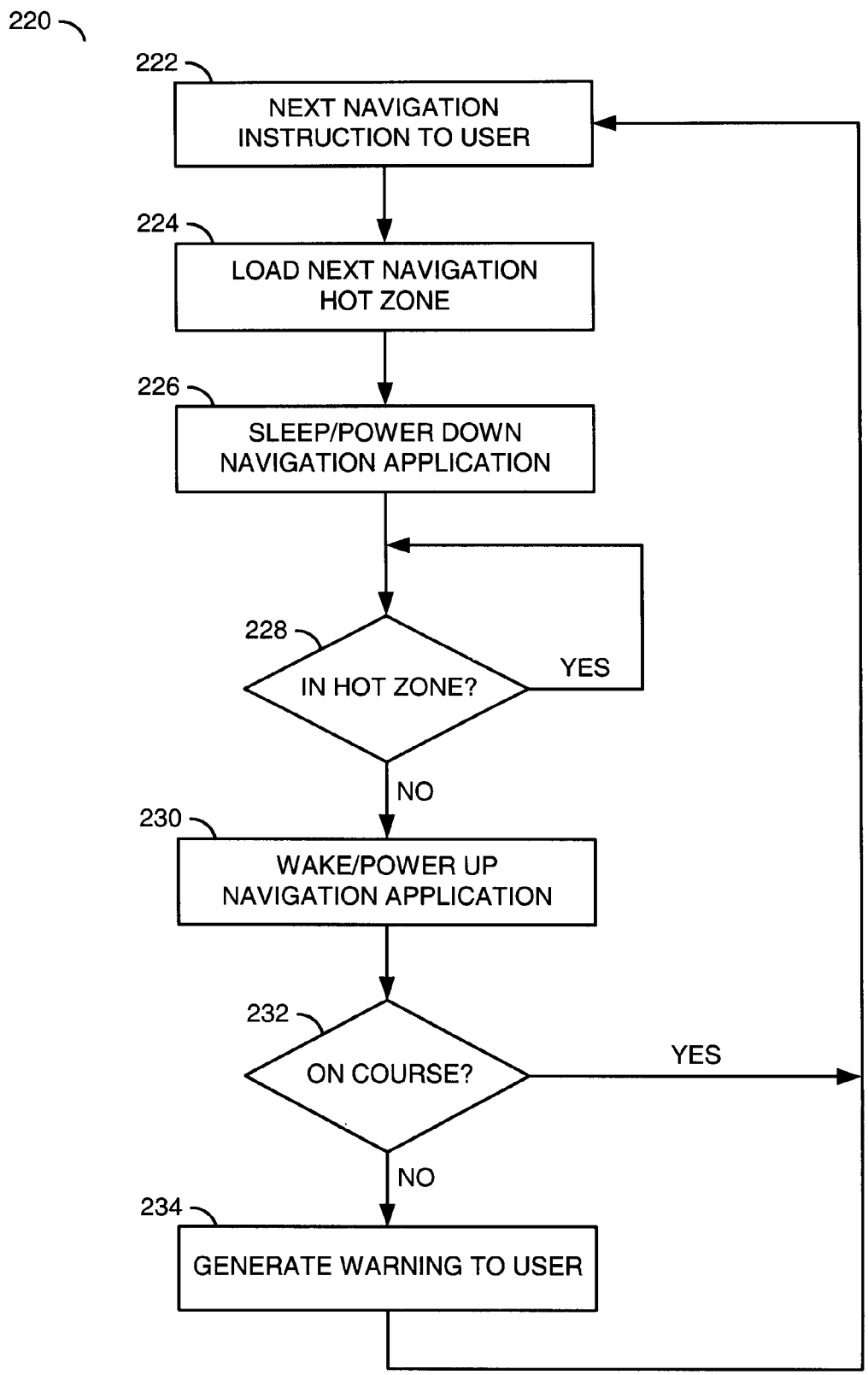
FIG. 8 is a flow diagram of an example navigation operation.

Referring to FIG. 8, a flow diagram of an example navigation operation 220 is shown. Navigation is a popular application for positioning technology, typically involving continuously tracking of the user's position, then displaying the position on a moving map and accompanied by periodic navigation instructions. The module 122 may be used to make a navigation application considerably more power efficient. The operation (or method) 220 generally comprises a step (or block) 222, a step (or block) 224, a step (or block) 226, a step (or block) 228, a step (or block) 230, a step (or block) 232 and a step (or block) 234.

In the step 222, an application module (e.g., 126a) may provide a navigation instruction from the device 104 to the user 106. In the step 224, a hot zone (e.g., 108g) in which the navigation instruction is valid (e.g., a zone around a particular stretch of road or, more generally, an area) may be downloaded into the module 122. Thereafter, the module 122 may manipulate the signal POWER to cause the navigation module 126a to power down or enter a low power sleep condition in the step 226.

As long as the device 104 remains in the current hot zone 108g (e.g., the YES branch of step 228), the module 126a may remain in the low power/off condition. When the module 122 determines that the device 104 has left the current hot zone 108g (e.g., the NO branch of step 228), the module 122 may adjust the signal POWER to power up/wake the navigation module 126a in the step 230.

If the current hot zone 108g was left because the user 106 is on course (e.g., the YES branch of step 232), the module 126a may present a next navigation instruction to the user 106 in the step 222 and the process repeats for the next stretch of road. If the current hot zone 108g was left because the user 106 departed from the current navigation instruction and thus is off course (e.g., the NO branch of step 232), the navigation module 126a may generate a warning to the user 106 in the step 234. Thereafter, the navigation module 126a may generate a next navigation instruction to return the user 106 to the proper course.

The determination of on course/off course may be made by one or both of the module 122 and the module 126a. The module 126a may make the determination based on the location of the device 104 compared with an end waypoint at the time that the device 104 leaves the current hot zone 108g. For example, the user 106 may be considered on course if the reported position of the device 104 is within a threshold distance (e.g., 50 meters) of the end waypoint. Otherwise, the user 106 may be considered off course.

The module 122 may also determine if the user 106 is on course or off course based on the valid crossing and the invalid crossing definitions of the current hot zone 108g. For example, if the device 104 left the current hot zone 108g through a valid segment, the user 106 may be considered on course. If the device 104 left the current hot zone 108g through an invalid segment (e.g., the entire perimeter except for the valid segment), the user 106 may be declared off course.

To further optimise power consumption, navigation instructions may be delivered to the user 106 via a voice synthesiser (e.g., "turn left" or "turn right"), rather than on a display with a moving map. In the above scenario, most of the device 104 may be shut down in between navigation instructions except for the subsystem 120 and module 122.

Referring to FIG. 9, a flow diagram for an example child tracking operation 240 is shown. Concerned parents may track a child's whereabouts by interrogating the child's cellular telephone via the cellular network. If the child's telephone includes a positioning subsystem, the telephone may be stimulated to calculate and then transmit the location of the child. Typically the application may only provide the child's location when demanded by the parent because the power consumed by the positioning subsystem and the application subsystem in the child's phone is constrained by the capacity of the battery. The tracking operation of the present invention may reduce power consumption in the phone. The operation (or method) 240 generally comprises a step (or block) 242, a step (or block) 244, a step (or block) 246 and a step (or block) 248.

An enhanced child tracking capability is enabled where the parent defines an allowable hot zone (e.g., 108c). In the step 242, the parent or guardian may download the allowable hot zone 108c into the cell phone device 104 of the child (or other person to be tracked). As long as the child remains in the allowable hot zone 108c (e.g., the YES branch of step 244), the module 122 may track the child's location and a tracking application module (e.g., 126b) may remain idle. As such, the child's location may be tracked continuously in a power efficient manner.

If the child wanders outside the allowable hot zone 108c (e.g., the NO branch of step 244), the module 126b may use the cellular telephone functions of the device 104 to call a telephone number of the parent or guardian in the step 246. After the call has been answered, the module 126b may synthesize an alert message in the step 248 to inform the parent/guardian that the child is outside the allowed hot zone 108c. As such, the parent or guardian may only be concerned when an alert is received from the child's device 104. The above technique may be used more generally for tracking any person or asset involving a combination of the subsystem 120, the module 122 and a communications subsystem (e.g., a cell phone).

Several time-dependent allowable hot zones (e.g., 108c-108f) may be loaded into the child's cell phone device 104 to account for normal movement during a day. For example, a first allowable hot zone 108c may cover a route of the child from a home to a school during a predetermined morning commute. A second hot zone 108d may be defined around the school property during normal school hours. The first hot zone 108c may be reactivated to cover the child's route from the school back to the home during a predetermined period after school.

Figure 10:
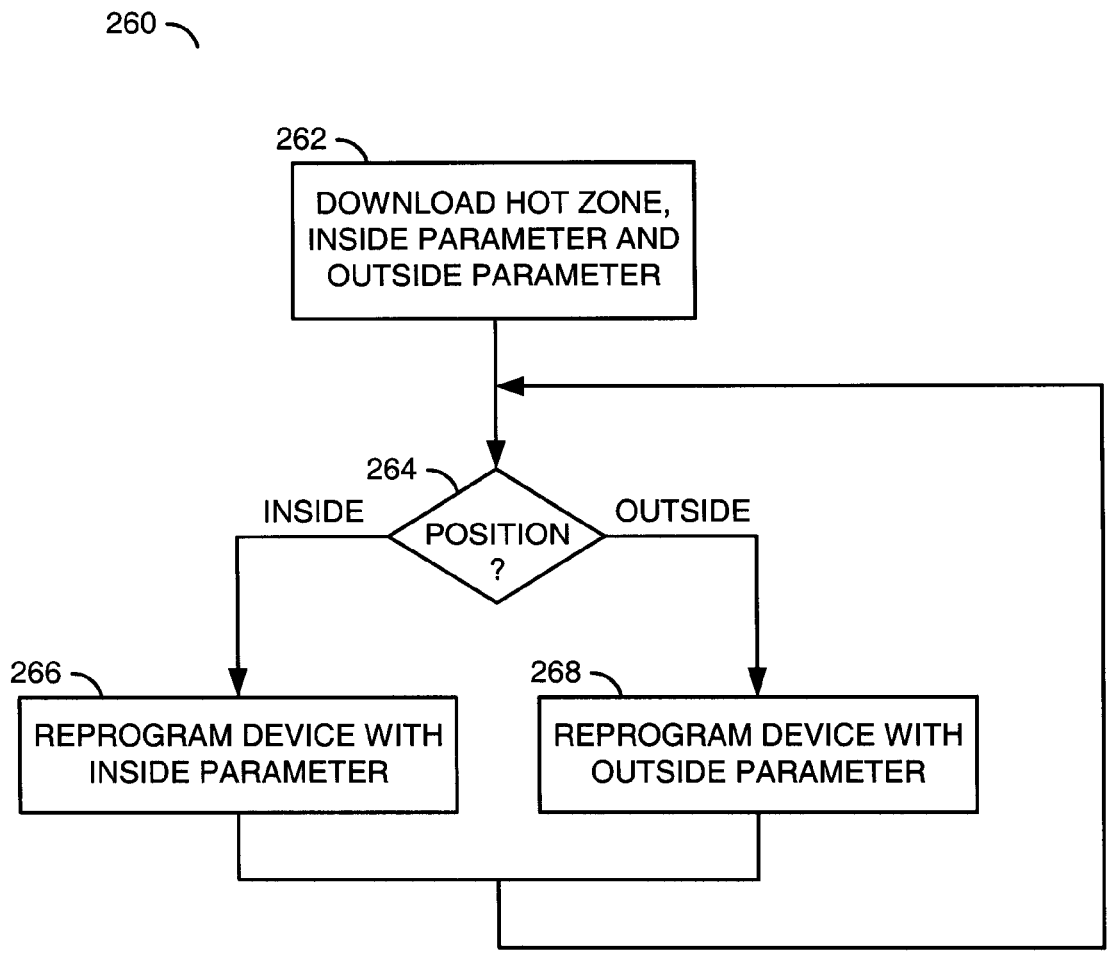
FIG. 10 is a flow diagram of an example personalization operation.

Referring to FIG. 10, a flow diagram of an example personalization operation 260 is shown. Personalizing a screen of a cellular telephone is a popular feature. The personalizing may include changing a "wallpaper" image shown on the display, changing a ring tone or changing a look and feel of the menu system. However, such personalization may be inappropriate in certain environments. For example, a ring tone enjoyed at home may not be appropriate in the work place. The personalization operation of the present invention may automatically adjust the phone. The operation (or method) 260 generally comprises a step (or block) 262, a step (or block) 264, a step (or block) 266 and a step (or block) 268.

The user of a cellular telephone implementing the present invention may draw hot zones (e.g., 108e-108f) around different environments, such as the work place or home. Different sets of personalization parameters may then be defined for each hot zone 108e-108f. The hot zones 108e-108f may then be downloaded into the device 104 in the step 262. The module 122 generally tracks the position of the device 104 and stimulates an application module (e.g., 126c) running on the device 104 to adjust the personalization parameters on the phone. When the device is inside a particular hot zone (e.g., the INSIDE branch of step 264), the module 126c may reprogram the device 104 with the corresponding set of parameters in the step 266. When the device 104 is outside the particular hot zone (e.g., the OUTSIDE branch of step 264), the module 126c may reprogram the device 104 with a different set of parameters in the step 268.

In some embodiments, the above concept may also be used to control the behavior of multiple cellular telephones in certain environments. For example, a cinema may subscribe to a service provided by a cellular telephone operator that automatically silences all cellular telephones that entered a hot zone defined to cover the cinema theaters.

Figure 11:
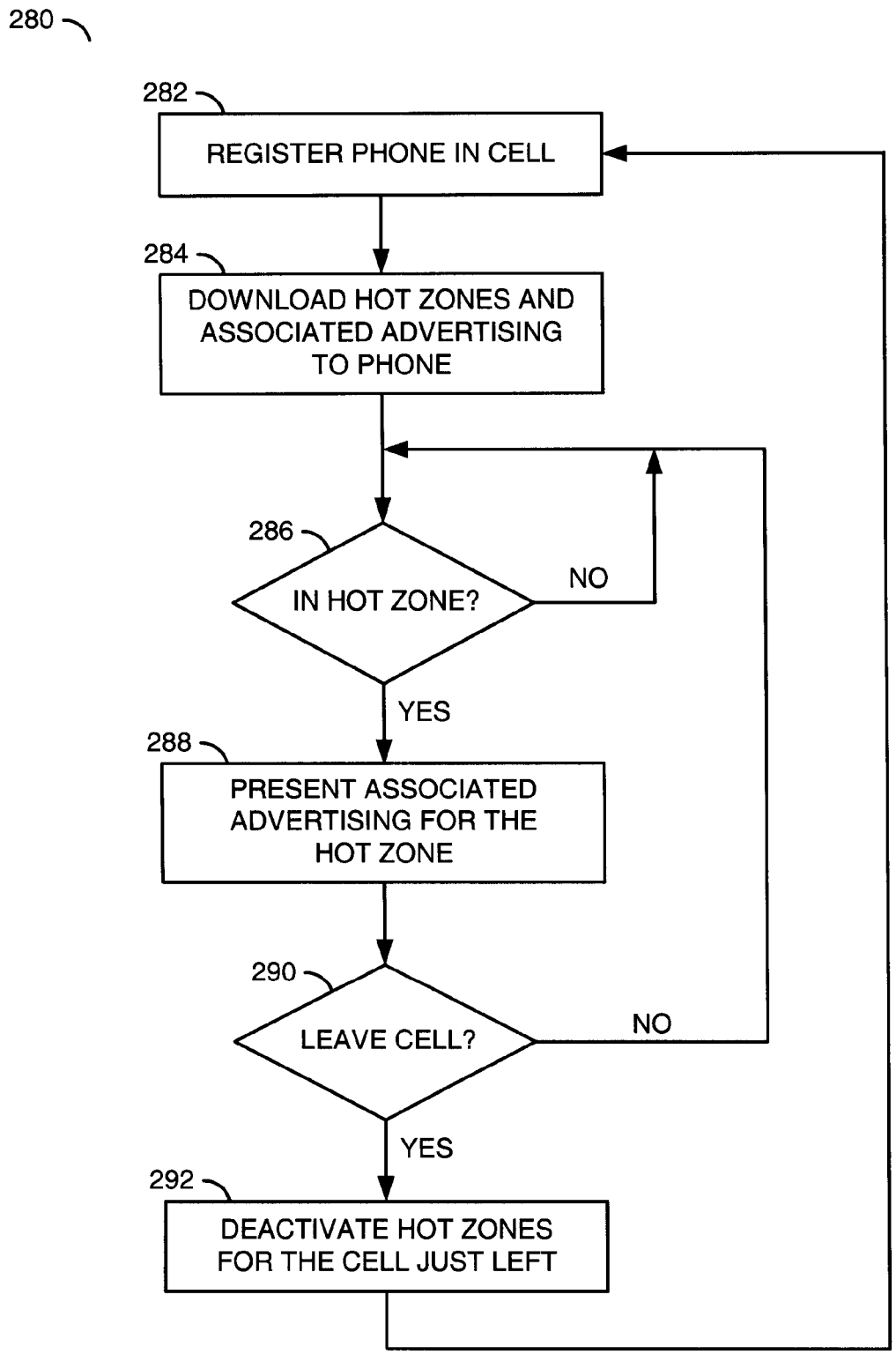
FIG. 11 is a flow diagram of an example advertising operation.

Referring to FIG. 11, a flow diagram of an example advertising operation 280 is shown. A strong source of future revenue for cellular network operators may be mobile advertising. The value of mobile advertising may be greatly enhanced by targeting the advertisements to cell phone users based on location. The operation (or method) 280 generally comprises a step (or block) 282, a step (or block) 284, a step (or block) 286, a step (or block) 288, a step (or block) 290 and a step (or block) 292.

In the step 282, a cell phone type device 104 may register in a particular cell. Definitions for one or more hot zones (e.g., 108a-108c) and all advertising data associated with each hot zone may be downloaded to the cell phone periodically in the step 284. For example, all data associated with a particular cell may be downloaded when the cell phone first moves into the cell.

In the step 286, the module 122 monitors the location of the device 104 relative to each hot zone 108a-108c. If the device 104 and the user 106 remain outside the hot zones 108a-108c (e.g., the NO branch of step 286), the module 122 generally continues to monitor the location. If the device 104 enters a particular hot zone (e.g., the YES branch of step 286), the module 122 stimulates a processor to execute a corresponding advertising application module (e.g., 126d). Thereafter, the module 126d may deliver the advertising messages to the user 106 in the step 288.

While the device 104 remains in the cell (e.g., the NO branch of step 290), the module 122 continues to monitor the location of the device 104 in the step 286 and the module 126d may continue to present the corresponding advertising in the step 288. The advertising may be displayed continuously, several advertisements may be presented in a rotating manner and/or once each for a short period (e.g., 10 seconds). When the device 104 leaves the cell (e.g., the YES branch of step 290), the module 122 may deactivate the module 126d in the step 292 to stop the advertising.

The present invention generally comprises a processing engine (e.g., the module 122) that compares position coordinates with a set of hot zones 108a-108k defined in two or three spatial dimensions and possibly defined in time. When the position coordinates cross the boundary of one or more of the hot zones 108a-108k, subject to a hysteresis circle or sphere 164 defined according to the accuracy of the positioning technology in use, the module 122 may generate one or more interrupts, including information regarding which hot zone boundary (or boundaries) has been crossed. In the context of battery operated, handheld equipment such as cellular telephones or PDA's, the module 122 may contribute to reducing the power consumption of many different location-based applications and services.

The function performed by the diagrams of FIGS. 2, 4 and 6-11 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of RFICs, ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for location-based zone triggering in a portable device, the portable device comprising an interface, a zone module and an application module, the method comprising:
   (A) generating a position signal conveying a location of said portable device in at least two spatial dimensions in response to a plurality of navigation signals received by said portable device; and
   (B) generating a trigger signal at said interface based on said position signal, (i) a first aspect of said trigger signal indicating that said location is crossing a boundary of a zone, (ii) a second aspect of said trigger signal indicating that said portable device is one of entering said zone and leaving said zone and (iii) said interface adapting said zone module to communicate said trigger signal to said application module.

2. The method according to claim 1, further comprising:
generating a power signal at said interface to (i) increase a power consumption of said application module when said portable device enters said zone and (ii) decrease said power consumption of said application module when said portable device leaves said zone.

3. The method according to claim 1, further comprising:
monitoring said location while said portable device is within said zone.

4. The method according to claim 1, further comprising:
suppressing notification of a next boundary crossing from said zone module to said application module until said portable device has moved at least a predetermined distance from an initial crossing point of said boundary.

5. The method according to claim 1, further comprising:
calculating an earliest time of arrival of said portable device at said boundary from said location.

6. The method according to claim 5, further comprising:
reducing a power consumption of said zone module until said earliest time of arrival.

7. The method according to claim 1, further comprising:
generating at least one data signal at said interface from said zone module to said application module, said data signal conveying at least one of (i) said location of said portable device at said crossing, (ii) a velocity of said portable device at said crossing, (iii) a trajectory of said portable device at said crossing, (iv) a time of said crossing, (v) a validity of said crossing and (vi) an identification of said zone.

8. The method according to claim 1, wherein said zone module accommodates said boundary changing over time.

9. The method according to claim 1, further comprising:
downloading a plurality of definitions for a plurality of different zones from a wireless network into said portable device in response to said portable device entering a space comprising said different zones.

10. The method according to claim 1, further comprising:
generating another trigger signal at another interface of said portable device to another application module of said portable device based on said position signal.

11. The method according to claim 1, wherein, after a positioning signal has been generated at a current position, a further positioning signal to check for a boundary crossing is generated no earlier than a predicted earliest time based on a distance of the current position from the boundary and a speed.

12. The method of claim 11, wherein the speed is a maximum speed.

13. The method of claim 11, wherein the speed is a device velocity.

14. A portable device comprising:
a position module configured to generate a position signal conveying a location of said portable device in at least two spatial dimensions in response to a plurality of navigation signals received by said portable device; and
a zone module (i) having an interface adapted to communicate with an application module and (ii) configured to generate a trigger signal at said interface based on said position signal, (iii) a first aspect of said trigger signal indicating that said location is crossing a boundary of a zone and (iv) a second aspect of said trigger signal indicating that said portable device is one of entering said zone and leaving said zone.

15. The portable device according to claim 14, wherein (i) said location comprises three spatial dimensions, (ii) said zone comprises a volume and (iii) said boundary comprises a surface of said volume.

16. The portable device according to claim 14, wherein said zone module is further configured to store a definition of said boundary from a zone signal received at said interface.

17. The portable device according to claim 14, further comprising said application module configured to utilize (i) a first power consumption when said portable device is inside said zone and (ii) a second power consumption when said portable device is outside said zone, said second power consumption being lower than said first power consumption.

18. The portable device according to claim 17, wherein said application module is configured to generate navigation directions perceivable by a user of said portable device.

19. The portable device according to claim 17, wherein said application module is configured to transmit an alert message to a receiver external to said portable device in response to said portable device leaving said zone.

20. The portable device according to claim 17, wherein said application module is configured to reprogram said portable device (i) with a first set of parameters upon entering said zone and (ii) a second set of parameters upon leaving said zone.

21. The portable device according to claim 17, wherein said application module is configured to generate advertising information perceivable by a user of said portable device.

22. The portable device according to claim 14, wherein said portable device comprises at least one of (i) a cell phone, (ii) a laptop computer, (iii) a palm computer, (iv) a personal digital assistant and (v) a heads-up display.

23. A portable device comprising:
   means for generating a position signal conveying a location of the portable device in at least two spatial dimensions in response to a plurality of navigation signals; and
   means for generating a trigger signal at an interface of the portable device based on said position signal, (i) a first aspect of said trigger signal indicating that said location is crossing a boundary of a zone, (ii) a second aspect of said trigger signal indicating that said portable device is one of entering said zone and leaving said zone, and (iii) said interface adapting said means for generating said trigger signal to communicate with an application module of said portable device.

* * * * *